(No Model.)

J. J. STOVER.
SHAFT BRAKE.

No. 572,649.  Patented Dec. 8, 1896.

WITNESSES:
John Buckler,
C. Gerst

INVENTOR
John Jacob Stover,
BY
Edgar Tate & Co
ATTORNEYS.

THE NORRIS PETERS CO., PHOTO-LITHO., WASHINGTON, D. C.

UNITED STATES PATENT OFFICE.

JOHN JACOB STOVER, OF ERWINNA, PENNSYLVANIA.

SHAFT-BRAKE.

SPECIFICATION forming part of Letters Patent No. 572,649, dated December 8, 1896.

Application filed February 29, 1896. Serial No. 581,360. (No model.)

*To all whom it may concern:*

Be it known that I, JOHN JACOB STOVER, a citizen of the United States, and a resident of Erwinna, in the county of Bucks and State of Pennsylvania, have invented certain new and useful Improvements in Shaft-Brakes, of which the following is a specification, reference being had to the accompanying drawings, forming a part thereof, in which similar letters of reference indicate corresponding parts.

This invention relates to brakes and to that class thereof usually employed in connection with power-shafts, pulley-shafts, and other and similar elements of machinery, and the object thereof is to provide an effective brace which is simple in construction and operation; and with this and other objects in view the invention consists in the construction, combination, and arrangement of parts hereinafter described and claimed.

The invention is fully disclosed in the following specification, of which the accompanying drawings form a part, in which—

Figure 1:
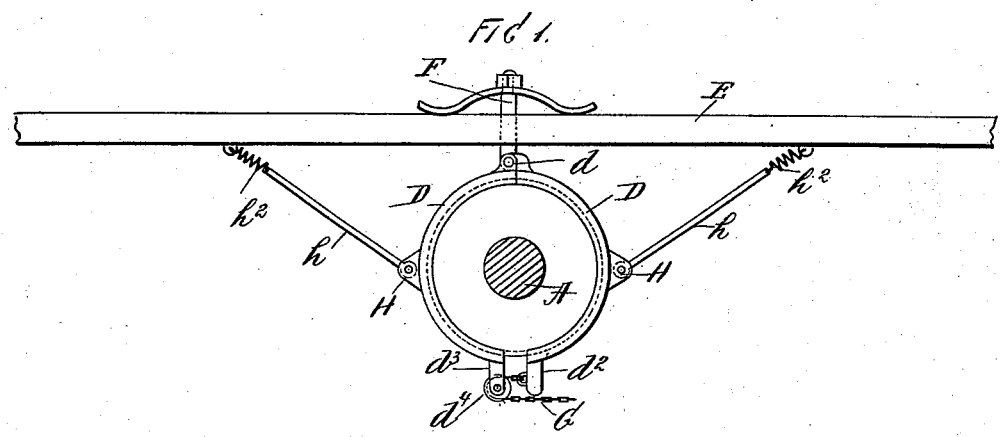
Figure 2:
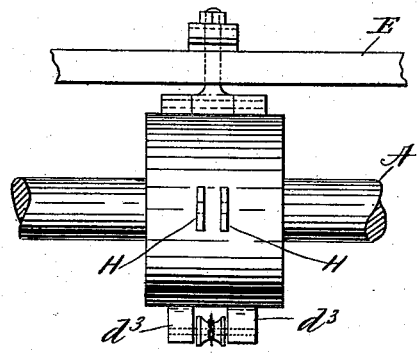
Figure 3:
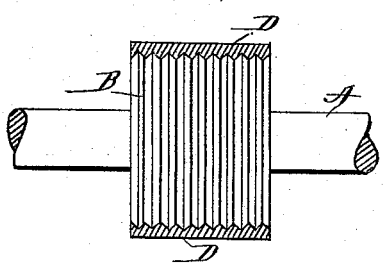

Figure 1 is an end view of my improved brake and showing the method of its operation; Fig. 2, a side view thereof, and Fig. 3 is a sectional view of the brake and also showing the method of its operation.

In the drawings forming part of this specification, A represents a power or pulley shaft, and mounted thereon and keyed thereto is a circular or cylindrical pulley B, which is provided with peripheral corrugations which resemble a screw-thread, and in the practice of my invention I provide a brake which is adapted to operate in connection with the pulley B, and which consists of two semicircular jaws D, which are hinged together at $d$, and which are suspended from or connected with a support E, of any desired form or construction, by means of a spring-supported bolt or rod F, which is connected with the hinged pin or bolt by which the jaws D are connected, and one of said jaws is provided with a depending shoulder or projection $d^2$ and the other with two shoulders or projections $d^3$, and mounted between the shoulders or projections $d^3$ is a pulley $d^4$, over which passes a cord or chain G, connected with the shoulder or projection $d^2$, and each of the jaws D is provided with projections or shoulders H, which are secured to or formed on the sides thereof, and between these shoulders or projections is pivoted a rod $h$, each of which is provided with a spiral spring $h^2$, which is secured to the support E, and the inner surfaces of the jaws D are grooved, so as to correspond with the peripheral grooves or projections formed on the pulley B.

The operation will be understood from the foregoing description when taken in connection with the accompanying drawings. In the normal position of the parts the jaws D are held out of contact with the pulley B, and whenever it is desired to apply the brake it is only necessary to pull upon the cord or chain G, so as to cause said jaws to clasp the pulley B, and by means of this device the movement of the shaft A may be regulated or said shaft may be entirely stopped, and it will thus be seen that I provide an effective brake and one which is simple in construction and operation and comparatively inexpensive.

My invention is not limited to the specific means for supporting the hinged jaws D, nor to the peculiar means for operating the same, herein described, and it is evident that the grooves on the inner surface thereof are not necessary, nor are the ribs formed on the pulley B, and it is evident that changes in and modifications of the construction herein described may be made without departing from the spirit of the invention or sacrificing its advantages.

Having fully described my invention, I claim as new and desire to secure by Letters Patent—

The herein-described shaft-brake composed of two interhinged jaws having annular corrugations, said jaws being provided with lugs at the ends of the sections, the lugs at one end of the sections forming a hinged connection, a chain connected with the lug at the end of one of the sections, a pulley mounted in the lug at the end of the other section over which said chain passes and by means of which the sections are forced together, laterally-extending lugs formed on said sections, rods pivotally connected with the last-mentioned lugs, springs connecting the free ends of the rods with the support and adapted to separate the sections, said sections being supported by means of a spring-supported bolt or rod, and adapted to operate in connection with a corrugated pulley as set forth.

In testimony that I claim the foregoing as my invention I have signed my name, in presence of the subscribing witnesses, this 21st day of February, 1896.

JOHN JACOB STOVER.

Witnesses:
HUGH C. STOVER,
JOHN CLEMENS.